(12) United States Patent
Chen et al.

(10) Patent No.: US 12,195,001 B2
(45) Date of Patent: Jan. 14, 2025

(54) METHOD FOR VEHICLE LANE CHANGING CONTROL, DEVICE, STORAGE MEDIUM, AND PROGRAM PRODUCT

(71) Applicant: Apollo Intelligent Connectivity (Beijing) Technology Co., Ltd., Beijing (CN)

(72) Inventors: Manni Chen, Beijing (CN); Binglin Zhang, Beijing (CN)

(73) Assignee: Apollo Intelligent Connectivity (Beijing) Technology Co., Ltd., Beijing (CN)

( * ) Notice: Subject to any disclaimer, the term of this patent is extended or adjusted under 35 U.S.C. 154(b) by 288 days.

(21) Appl. No.: 17/703,809

(22) Filed: Mar. 24, 2022

(65) Prior Publication Data

US 2022/0212671 A1    Jul. 7, 2022

(30) Foreign Application Priority Data

Apr. 16, 2021    (CN) .......................... 202110414486.3

(51) Int. Cl.
*B60W 30/18*    (2012.01)

(52) U.S. Cl.
CPC ... *B60W 30/18163* (2013.01); *B60W 2520/10* (2013.01); *B60W 2552/05* (2020.02);
(Continued)

(58) Field of Classification Search
CPC ....... B60W 30/18163; B60W 2520/10; B60W 2552/05; B60W 2552/10; B60W 2555/20;
(Continued)

(56) References Cited

U.S. PATENT DOCUMENTS

| | | | |
|---|---|---|---|
| 7,831,433 B1* | 11/2010 | Belvin .................... | G10L 15/18 704/275 |
| 10,202,112 B2* | 2/2019 | Gaither ........... | B60W 30/18154 |

(Continued)

FOREIGN PATENT DOCUMENTS

| CN | 110763246 A | 2/2020 |
|---|---|---|
| CN | 111489575 A | 8/2020 |

(Continued)

OTHER PUBLICATIONS

Sato Yuji, Feb. 13, 2014, English Machine Translation_ JP2015152386A provided by Patent Translate by EPO and Google (Year: 2014).*

(Continued)

*Primary Examiner* — Ashley L Redhead, Jr.
(74) *Attorney, Agent, or Firm* — J.C. PATENTS

(57) ABSTRACT

A method for vehicle lane changing control, a device, a storage medium and a program product, relating to the fields of autonomous driving, intelligent transportation, big data, cloud computing, etc. in computer technology. A specific implementation solution is: during a process of vehicle driving, when a distance between the vehicle and a front bifurcation is less than or equal to a longest lane changing operation distance, according to map data and traffic data of a road section ahead, it is determined whether a current position is a preferred position to start performing the lane changing operation, so as to determine whether performing the lane changing operation at the current position; and if determined to perform the lane changing operation at the current position, lane changing operation execution information will be issued to enable the vehicle to start performing the lane changing operation at the current position.

16 Claims, 5 Drawing Sheets

(52) U.S. Cl.
CPC ..... *B60W 2552/10* (2020.02); *B60W 2555/20* (2020.02); *B60W 2556/10* (2020.02); *B60W 2556/40* (2020.02)

(58) Field of Classification Search
CPC ......... B60W 2556/10; B60W 2556/40; B60W 60/001; B60W 2552/15; B60W 2554/406; B60W 2556/50; B60W 2556/00; B60W 40/04; B60W 40/06; B60W 40/105; B60W 60/0016; B60W 2050/0005; B60W 2530/18; B60W 2554/802; B60W 2555/60; B62D 15/0255; G01C 21/3658; G01C 21/3655; G01C 21/26; G08G 1/167; G06F 9/06
See application file for complete search history.

(56) References Cited

U.S. PATENT DOCUMENTS

| | | | |
|---|---|---|---|
| 2009/0060647 A1* | 3/2009 | Denison | E01C 1/02 404/1 |
| 2011/0276257 A1* | 11/2011 | Zaitsu | G08G 1/0104 701/532 |
| 2012/0123659 A1* | 5/2012 | Sato | G08G 1/163 701/96 |
| 2014/0350845 A1* | 11/2014 | Hayashi | G01C 21/20 701/428 |
| 2017/0043780 A1 | 2/2017 | Yoon | |
| 2017/0341653 A1* | 11/2017 | Kubota | B60W 50/0097 |
| 2018/0172469 A1 | 6/2018 | Obenaus | |
| 2020/0180639 A1 | 6/2020 | Mizoguchi | |
| 2020/0377117 A1* | 12/2020 | Nojiri | G08G 1/123 |
| 2021/0146962 A1* | 5/2021 | Kaji | B60W 30/17 |

FOREIGN PATENT DOCUMENTS

| | | |
|---|---|---|
| CN | 111746542 A | 10/2020 |
| CN | 111783536 A | 10/2020 |
| CN | 112298180 A | 2/2021 |
| CN | 112416004 A | 2/2021 |
| JP | H11339186 A | 12/1999 |
| JP | 2015152386 A * | 8/2015 |
| JP | 2017142145 A | 8/2017 |
| JP | 2020095336 A | 6/2020 |
| JP | 2021020475 A | 2/2021 |
| KR | 101449161 B1 | 10/2014 |
| KR | 20170018564 A | 2/2017 |
| KR | 20180050779 A | 5/2018 |

OTHER PUBLICATIONS

First Office Action of the priority application CN202110414486.3.
First Office Action of the parallel application JP2022-056260.
Extended European Search Report of the parallel application EP22165534.3.
Notice of Allowance of the parallel application KR10-2022-0031390.

* cited by examiner

METHOD FOR VEHICLE LANE CHANGING CONTROL, DEVICE, STORAGE MEDIUM, AND PROGRAM PRODUCT

CROSS-REFERENCE TO RELATED APPLICATIONS

This application claims priority to Chinese Patent Application No. 202110414486.3, filed on Apr. 16, 2021, which is hereby incorporated by reference in its entirety.

TECHNICAL FIELD

The present application relates to the fields of autonomous driving, intelligent transportation, big data, cloud computing, etc. in computer technology and, in particular, to a method for vehicle lane changing control, a device, a storage medium and a program product.

BACKGROUND

During a process that vehicles are driving on expressways, urban expressways and other roads, when encountering a bifurcation, such as a ramp or road changing, and requiring to change to a branch road to drive, they need to change a lane on a current road to a target lane enabling to directly cut into the branch road in advance, so as to ensure entering the branch road quickly and correctly at a bifurcation position.

At present, when encountering a bifurcation and requiring to change to drive on a branch road, an autonomous driving vehicle often uses a fixed distance to complete lane changing in advance. An automatic driving system presets the fixed advance lane changing, such as R meters; and when driving to R meters before the bifurcation position, the vehicle starts to change a lane.

If an advance lane changing distance is set to be short, it is required that the vehicle needs to complete a lane changing operation in a very short time. If vehicle speeds of both current lane and adjacent lane are high and a plurality of vehicles exist, a lane changing may easily fail, causing missing the bifurcation; and if the advance lane changing distance is long, changing to a target lane too early may easily cause the vehicle to be blocked by low-speed vehicles such as trucks and buses in front, causing low driving efficiency of the vehicle.

SUMMARY

The present application provides a method for vehicle lane changing control, a device, a storage medium and a program product.

According to a first aspect of the present application, a method for vehicle lane changing control is provided, including:
  acquiring map data and traffic data of a road section ahead when a distance between a vehicle and a front bifurcation is less than or equal to a longest lane changing operation distance during a process of vehicle driving, where the road section ahead includes at least a road between a current position of the vehicle and the bifurcation, and the vehicle needs to change from a current lane to a target lane before driving to the bifurcation; and
  if it is determined to perform a lane changing operation at the current position based on the map data and the traffic data of the road section ahead, issuing lane changing operation execution information.

According to a second aspect of the present application, a device for vehicle lane changing control is provided, including:
  a data acquiring unit, configured to acquire map data and traffic data of a road section ahead when a distance between a vehicle and a front bifurcation is less than or equal to a longest lane changing operation distance during a process of vehicle driving, where the road section ahead includes at least a road between a current position of the vehicle and the bifurcation, and the vehicle needs to change from a current lane to a target lane before driving to the bifurcation; and
  a lane changing decision unit, configured to issue lane changing operation execution information if it is determined to perform the lane changing operation at the current position based on the map data and the traffic data of the road section ahead.

According to a third aspect of the present application, an electronic device is provided, including:
  at least one processor; and
  a memory that is connected in communication with the at least one processor; where,
  the memory stores instructions executable by the at least one processor, and the instructions are executed by the at least one processor to enable the at least one processor to execute the method described in the first aspect.

According to a fourth aspect of the present application, a non-transitory computer-readable storage medium storing computer instructions is provided, where the computer instructions are configured to enable the computer to execute the method described in the first aspect.

According to a fifth aspect of the present application, a computer program product is provided, where the program product includes: a computer program stored in a readable storage medium, and at least one processor of an electronic device is able to read the computer program from the readable storage medium, and the at least one processor executes the computer program to enable the electronic device to execute the method described in the first aspect.

The technology according to the present application improves success rate of vehicle lane changing and average driving efficiency of a vehicle.

It should be understood that the content described in this section is not intended to identify the key or important features of embodiments of the present application, nor is it used to limit the scope of the present application. Other features of the present application will be easily understood through the following description.

BRIEF DESCRIPTION OF THE DRAWINGS

Drawings are used to better understand the solution, and do not constitute a limitation to the present application. Among them.

DETAILED DESCRIPTION OF EMBODIMENTS

In conjunction with accompanying drawings, the exemplary embodiments of the present application are described below, which include various details of the embodiments of the present application to facilitate understanding, and they should be regarded as merely exemplary. Therefore, those of ordinary skilled in the art should realize that various changes and modifications may be made to the embodiments described herein without departing from the scope and spirit of the present application. Likewise, for clarity and conciseness, descriptions of well-known functions and structures are omitted in the following.

The present application provides a method for vehicle lane changing control, a device, a storage medium, and a program product, which are applied to the fields of autonomous driving, intelligent transportation, big data, cloud computing, etc. in computer technology, so that a vehicle starts a lane changing operation at a more preferred position, thereby improving success rate of vehicle lane changing and average driving efficiency of the vehicle.

Figure 1:
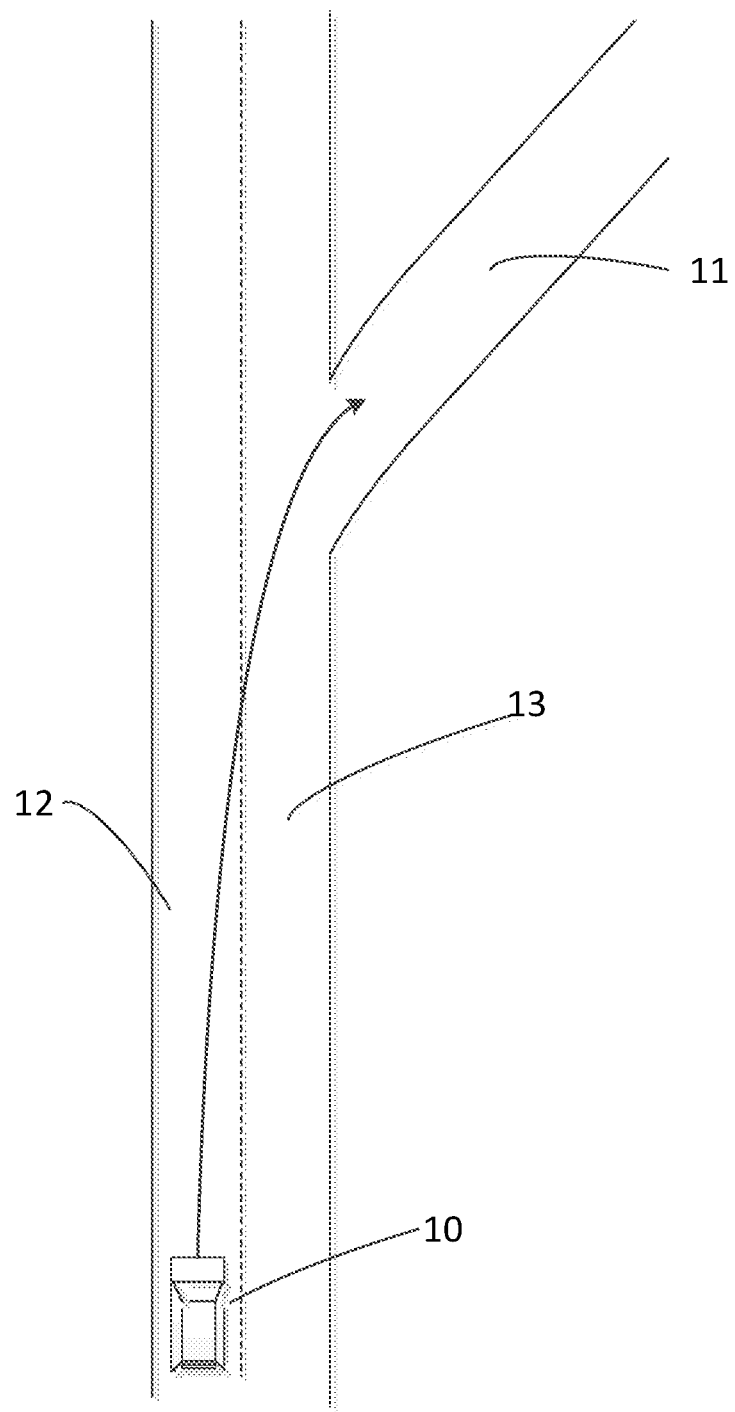
FIG. 1 is a scene diagram that may implement vehicle lane changing control of an embodiment of the present application.

The method for the vehicle lane changing control provided by the present application may be applied to autonomous vehicles or ordinary vehicles, and may be specifically applied to a scene shown in FIG. 1, as shown in FIG. 1, when a vehicle 10 is driving on a road, for a bifurcation encountered ahead (such as a ramp, a main and auxiliary road switching, road changing, etc.), if requiring to drive on a branch road 11 ahead on the right, the vehicle 10 needs to change from a current driving lane 12 on a current road in advance to a target lane 13 adjacent to a branch road, in this way may it be ensured that the vehicle 10 is able to quickly and accurately enter the branch road 11 when driving to the bifurcation. The method for vehicle lane changing control provided by the present application is: during a process of vehicle driving, when a distance between the vehicle and a front bifurcation is less than or equal to a longest lane changing operation distance, according to map data and traffic data of a road section ahead, it can be determined whether a current position is a preferred position to start performing the lane changing operation, so as to determine whether performing the lane changing operation at the current position; and if it is determined that the current position is the preferred position to start performing the lane changing operation, that is, it is determined to perform the lane changing operation at the current position, lane changing operation execution information is issued to enable the vehicle to start performing the lane changing operation at the current position, being able to select a preferred and more reasonable position to start performing the lane changing operation, improving success rate of the vehicle lane changing, avoiding prematurely changing to a target lane, and improving average driving efficiency of the vehicle.

In addition, FIG. 1 is only an example of an application scenario of the method for the vehicle lane changing control provided by the present application, and the method may also be applied to other scenarios, which is not specifically limited in this embodiment.

Figure 2:
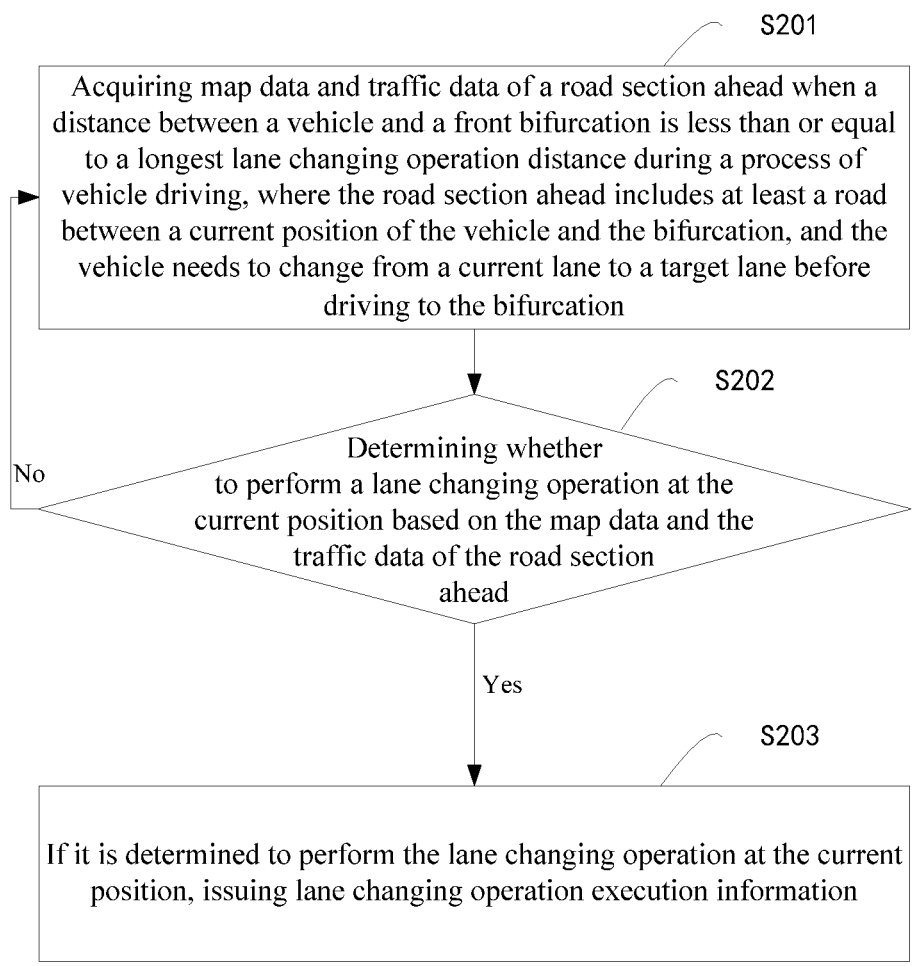
FIG. 2 is a flowchart of a method for vehicle lane changing control provided by Embodiment 1 of the present application.

FIG. 2 is a flowchart of a method for vehicle lane changing control provided by Embodiment 1 of the present application. An executive entity of this embodiment may be an electronic device used for the vehicle lane changing control, specifically, may be a cloud server, or a vehicle-mounted terminal on a vehicle, etc. This embodiment exemplifies the electronic device as an example. As shown in FIG. 2, specific steps of the method are as follows:

Step S201, acquiring map data and traffic data of a road section ahead when a distance between a vehicle and a front bifurcation is less than or equal to a longest lane changing operation distance during a process of vehicle driving, where the road section ahead includes at least a road between a current position of the vehicle and the bifurcation, and the vehicle needs to change from a current lane to a target lane before driving to the bifurcation.

Where the target lane refers to a lane where the vehicle on the current road may enter a target road after a lane changing.

During the driving process of the vehicle, if a bifurcation is encountered in front of the vehicle, and the vehicle needs to leave the current road and enter the other road (called the target road) to drive, such as turning right, turning left, turning around, switching between a main road and an auxiliary road, entering the ramp, entering a branch road and so on. If the vehicle is not driving on the target lane, it needs to change a lane to enter the target lane in advance before reaching the bifurcation, so as to ensure that the vehicle may accurately and smoothly enter the target road at the bifurcation.

In this embodiment, it is acquired the map data and the traffic data of the road section ahead when the distance between the vehicle and the front bifurcation is less than or equal to the longest lane changing operation distance, based on the map data and the traffic data of the road section ahead, it is determined that whether the vehicle starts to change a lane at the current position.

Exemplarily, the map data and the traffic data of the road section ahead may include: lane line information, lane information, traffic condition information of each lane of the road section ahead, traffic road condition information of the road section ahead, etc., and may also include relevant information about factors of other roads that affect a vehicle lane changing. Based on the map data and the traffic data of the road section ahead, a process of the vehicle performing a lane changing operation may be simulated, and it may be predicted whether the current position is a preferred position where the vehicle starts to perform the lane changing operation.

Optionally, the map data and the traffic data of the road section ahead may be determined in combination with high-precision map data, standard map data, and other data.

Step S202, determining whether to perform a lane changing operation at the current position based on the map data and the traffic data of the road section ahead.

In this step, it may be determined whether the current position is the preferred position where the vehicle starts to perform the lane changing operation based on the map data and the traffic data of the road section ahead, so as to determine whether to perform the lane changing operation at the current position.

If the current position is the preferred position where the vehicle starts to perform the lane changing operation, then starting to perform the lane changing operation at the current position may ensure that the vehicle enters the target lane before driving to the bifurcation and may avoid prematurely changing to the target lane, thus, it is determined to perform the lane changing operation at the current position.

If the current position is not the preferred position where the vehicle starts to perform the lane changing operation, it is determined not to perform the lane changing operation at the current position and the vehicle continues to drive. After a period of time or a certain distance, it is determined whether to start the lane changing operation at the position of the vehicle based on the map data and the traffic data of the road section ahead of the vehicle again until when the vehicle reaches a suitable position for starting to perform the lane changing operation, it is determined to start performing the lane changing operation at the suitable position, and lane changing operation execution information is issued.

Step S203, if it is determined to perform the lane changing operation at the current position, issuing lane changing operation execution information.

If it is determined to perform the lane changing operation at the current position, the lane changing operation execution information is issued, so that the vehicle starts to perform the lane changing operation at the current position.

In this embodiment of the present application, during a process of vehicle driving, when a distance between the vehicle and a front bifurcation is less than or equal to a longest lane changing operation distance, according to map data and traffic data of a road section ahead, it can be determined whether a current position is a preferred position to start performing the lane changing operation, so as to determine whether performing the lane changing operation at the current position; and if it is determined that the current position is the preferred position to start performing the lane changing operation, that is, it is determined to perform the lane changing operation at the current position, lane changing operation execution information is issued to enable the vehicle to start performing the lane changing operation at the current position, being able to select a preferred and more reasonable position to start performing the lane changing operation, improving success rate of the vehicle lane changing, avoiding prematurely changing to a target lane, and improving average driving efficiency of the vehicle.

Figure 3:
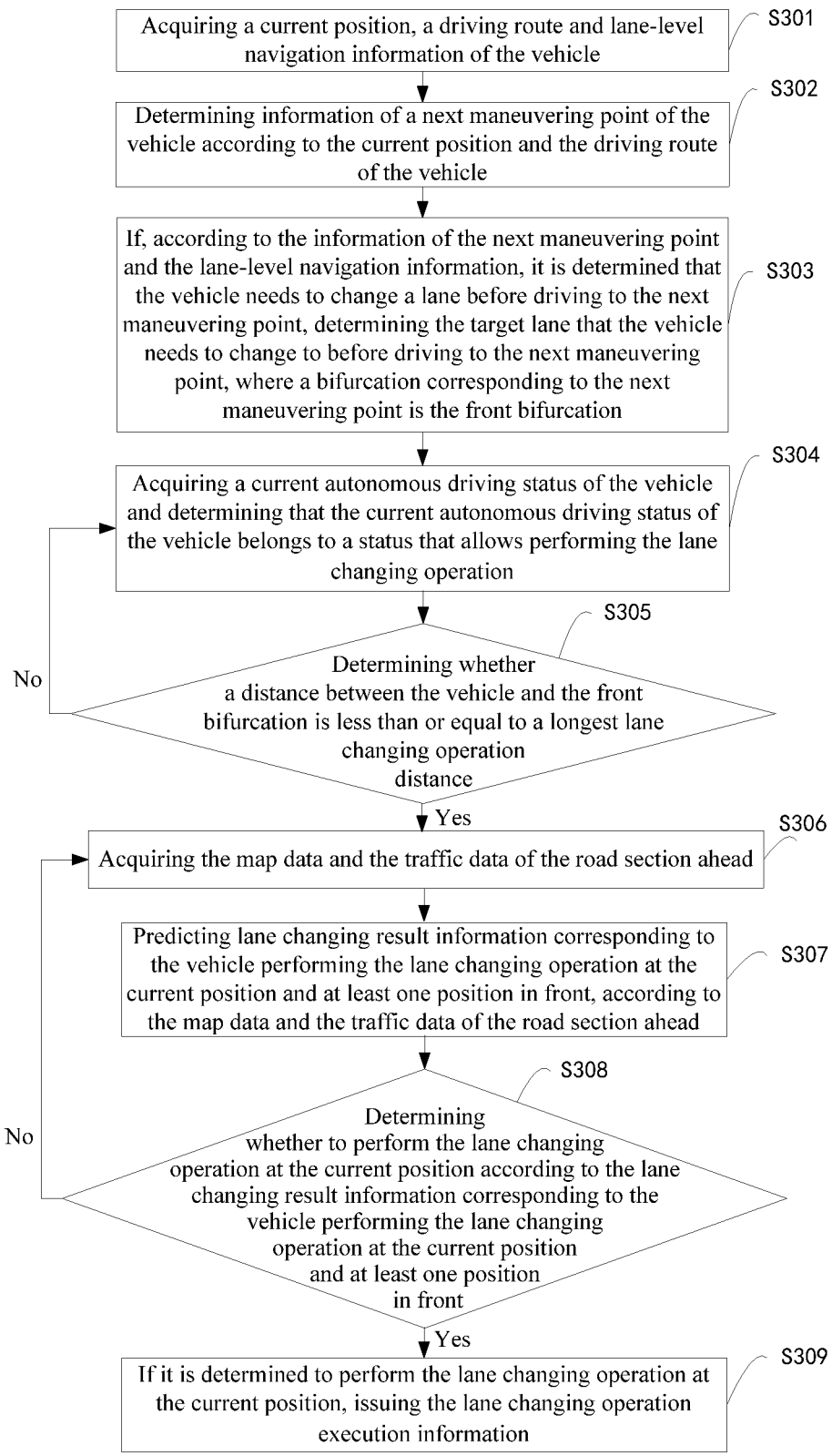
FIG. 3 is flowchart of a method for vehicle lane changing control provided by Embodiment 2 of the present application.

FIG. 3 is flowchart of a method for vehicle lane changing control provided by Embodiment 2 of the present application. On the basis of the above-mentioned Embodiment 1, in this embodiment, it is determined whether to perform the lane changing operation at the current position based on the map data and the traffic data of the road section ahead includes: according to the map data and the traffic data of the road section ahead, it is predicted lane changing result information corresponding to the vehicle performing the lane changing operation at the current position and at least one position ahead; and it is determined whether to perform the lane changing operation at the current position according to the lane changing result information corresponding to the vehicle performing the lane changing operation at the current position and at least one position in front, which may accurately determine whether the current position is the preferred position to start performing the lane changing operation, so as to determine whether the lane changing operation is performed at the current position. As shown in FIG. 3, specific steps of the method are as follows:

Step S301, acquiring a current position, a driving route and lane-level navigation information of a vehicle.

In this embodiment, the vehicle reports the current position to an electronic device according to a preset frequency during a driving process. After receiving the current position reported by the vehicle, the electronic device may update the driving route and the lane-level navigation information of the vehicle in real time according to the current position of the vehicle.

Where the frequency of reporting the current position may be set by setting a reporting interval or an interval distance, for example, a frequency of updating the navigation information of the vehicle may be adopted, which is not specifically limited in this embodiment.

Step S302, determining information of a next maneuvering point of the vehicle according to the current position and the driving route of the vehicle.

After acquiring the current position and the driving route of the vehicle, the information of the next maneuvering point of the driving route of the vehicle may be determined.

Where the next maneuvering point of the vehicle is the maneuvering point that the vehicle will continue to pass along the current driving route.

The information of the maneuvering point includes coordinates of the maneuvering point, types of the maneuvering point, a navigation direction of the vehicle at the maneuvering point, and a name of a road, etc. The types of the maneuvering point may be an intersection, a T-junction, a high-speed entrance/exit, and a main and auxiliary road switching point, etc.

The driving route includes information about a series of the maneuvering points on the driving route. According to the current position and the driving route of the vehicle, the next maneuvering point that the vehicle will pass is determined.

Step S303, if, according to the information of the next maneuvering point and the lane-level navigation information, it is determined that the vehicle needs to change a lane before driving to the next maneuvering point, determining the target lane that the vehicle needs to change to before driving to the next maneuvering point, where a bifurcation corresponding to the next maneuvering point is the front bifurcation.

After determining the information of the next maneuvering point of the vehicle, according to the type of the next maneuvering point, the navigation direction of the vehicle at the next maneuvering point, and the lane-level navigation information, the target lane that needs to be entered before driving to the next maneuvering point may be determined when the vehicle continues driving along the navigation direction at the next maneuvering point. If a current lane of the vehicle is not the target lane, then the vehicle needs to change to the target lane before driving to the next maneuvering point, at this time, it needs to activate the lane changing control process for the vehicle.

Through the above steps S301-S303, during the process of the vehicle driving, it can be determined that the vehicle needs to change from the current lane to the target lane before driving to the front bifurcation, when the vehicle meets a timing of a lane changing tracking, the lane changing control process of the vehicle may be activated in time, so as to provide sufficient time and distance for the vehicle to select a preferred position to start the lane changing operation.

Step S304, acquiring a current autonomous driving status of the vehicle and determining that the current autonomous driving status of the vehicle belongs to a status that allows to perform the lane changing operation.

In this step, before acquiring the map data and the traffic data of the road section ahead, the current autonomous driving status of the vehicle may also be acquired, and it is determined that the current autonomous driving status of the vehicle is a status that allows to perform the lane changing operation, and when a distance between the vehicle and the front bifurcation is less than or equal to a longest lane changing operation distance, it is determined that the vehicle meets the timing of the lane changing tracking, and it is determined whether the vehicle performs the lane changing control at the current position by acquiring the map data and the traffic data of the road section ahead, and based on the map data and the traffic data of the road section ahead. If it is determined to perform the lane changing operation at the current position, lane changing operation execution information is issued, which may improve safety of the autonomous driving vehicle.

Exemplarily, the autonomous driving status of the vehicle includes: normal driving along the road, preparing to change a lane, changing a lane, braking, stopped, etc. For example, the preparing to change a lane includes preparing to change a lane to the right, preparing to change a lane to the left, etc.; and the changing a lane includes changing a lane to the right, changing a lane to the left, etc.

Where statuses such as preparing to change a lane, changing a lane, braking and stopped are statuses that do not allow performing a lane changing operation, and a status of normal driving along the road is a status that allows to perform a lane changing operation.

In order to improve the safety of the autonomous driving vehicle, if the autonomous driving vehicle is in a status of preparing to change a lane, changing a lane, braking, or stopped, etc., the autonomous driving vehicle is not allowed to perform a lane changing operation. In addition, what does autonomous driving status of the vehicle include and which autonomous driving statuses belong to the status that allows performing the lane changing operation may be configured and modified according to the needs of an actual application scenario, which is not specifically limited here.

Optionally, the vehicle may report the autonomous driving status while reporting the current position.

Step S305, determining whether a distance between the vehicle and the front bifurcation is less than or equal to the longest lane changing operation distance.

In this step, when it is determined that the vehicle needs to change from the current lane to the target lane before driving to the front bifurcation, each time the vehicle-reported position is received, a distance between the current position and the next maneuvering point may be calculated according to the current position of the vehicle, and then the distance between the vehicle and the bifurcation is obtained; by comparing the distance between the vehicle and the bifurcation with the longest lane changing operation distance, it may be determined whether the distance between the vehicle and the front bifurcation is less than or equal to the longest lane changing operation distance.

If the distance between the vehicle and the front bifurcation is less than or equal to the longest lane changing operation distance, then it is determined that the vehicle meets the timing of the lane changing tracking, and it is started to evaluate the timing of the lane changing of the vehicle and determine whether the vehicle performs the lane changing control at the current position by acquiring the map data and the traffic data of the road section ahead, and based on the map data and the traffic data of the road section ahead. If it is determined to perform the lane changing operation at the current position, the lane changing operation execution information is issued.

Optionally, in another embodiment, it may be determined first whether the distance between the vehicle and the front bifurcation is less than or equal to the longest lane changing operation distance, and when it is determined that the distance between the vehicle and the front bifurcation is less than or equal to the longest lane changing operation distance, it is determined whether the current autonomous driving status of the vehicle belongs to the status that allows to perform the lane changing operation. An execution order of the above step S304 and step S305 is not specifically limited.

If the timing of the lane changing tracking is met, the vehicle enters a lane changing tracking status, for the vehicle in the lane changing tracking status, the lane changing control process of steps S306-S309 is executed based on a preset tracking rule, and according to the map data and the traffic data of the road section ahead, it is determined whether to execute the lane changing operation at the current position. If it is determined to execute the lane changing operation at the current position, the lane changing operation execution information is issued.

Where the preset tracking rule may be that every time the vehicle reports a position, or every interval of time, or every interval of a certain distance, the lane changing control process of steps S306-S309 is performed once. The lane changing operation execution information is used to enable the vehicle to start performing lane changing operation. After starting to perform the lane changing operation, the vehicle enters a status of preparing for lane changing.

In an optional implementation, the determination of meeting the timing of the lane changing tracking and the previous process may be performed on a lane changing monitor on the vehicle. If the lane changing monitor determines that the timing of the lane changing tracking is met, the lane changing monitor sends lane changing tracking information to a remote server (such as a cloud service). After the remote server receives the lane changing tracking information, steps S306-S309 are executed to perform the lane changing control process on the vehicle.

In another optional implementation, steps S301-S309, determining whether the vehicle meets the timing of the lane changing tracking and performing lane changing control process on the vehicle after determining that the vehicle meets the timing of the lane changing tracking, which may be executed by a remote server, or may be executed by an in-vehicle terminal.

Step S306, acquiring the map data and the traffic data of the road section ahead.

Exemplarily, the map data and the traffic data of the road section ahead may include: lane line information, lane information, traffic condition information of each lane of the road section ahead, traffic road condition information of the road section ahead, etc., and may also include relevant information about factors of other roads that affect a vehicle lane changing. In addition, the map data and the traffic data acquired may also include data related to other factors that affect the vehicle lane changing, which is not specifically limited here.

Where the lane line information may include information such as a position, a type (such as a dashed line, a solid line, etc.) and a distance of the lane line, the lane information may include information such as the number and the position of lanes on the road, and the traffic condition includes congestion information, average vehicle speed, etc.

In an optional implementation, the longest lane changing operation distance may be determined according to a following method:

determining an initial lane changing operation distance of the road section ahead according to a road level of the road section ahead; determining a lane changing operation distance adjustment value according to a historical lane changing operation distance of the road section ahead in a current period of time; and determining the longest lane changing operation distance according to the initial lane changing operation distance of the road section ahead and the lane changing operation distance adjustment value.

In this way, the longest lane changing operation distance of the vehicle in the road section ahead may be accurately determined, and the timing to monitor the lane changing of the vehicle may be accurately determined. While ensuring that the preferred position to start the lane changing operation is not missed, wasting resources may be avoided.

Where the initial lane changing operation distance corresponding to different road levels may be different, and the initial lane changing operation distance corresponding to each road level may be configured and adjusted according to actual application scenarios and empirical values, which is not specifically limited here.

The lane changing operation distance adjustment value is an adjustment value of the lane changing operation distance of the vehicle on the current road obtained according to historical data. The adjustment value is obtained by a deep learning model based on the distance of the lane changing in advance of the vehicle in the road section ahead in the current period of time. The lane changing operation distance adjustment value may be positive or negative.

Optionally, the longest lane changing operation distance may be a sum of the initial lane changing operation distance of the road section ahead and the lane changing operation distance adjustment value. In addition, the longest lane changing operation distance may also be a result of a weighted summation of the initial lane changing operation distance of the road section ahead and the lane changing operation distance adjustment value, or a result of calculation and determination in other ways.

Step S307, predicting lane changing result information corresponding to the vehicle performing the lane changing operation at the current position and at least one position in front, according to the map data and the traffic data of the road section ahead.

Where the lane changing result information includes at least one of the following: a duration required for the lane changing, a lane changing operation distance, a distance and a duration of driving in the target lane after the lane changing succeeds and a speed difference of the vehicle before and after the lane changing.

The duration required for the lane changing is duration for executing the lane changing operation process, that is, a duration that the vehicle takes from the beginning of the lane changing operation to the finish of the lane changing operation.

The lane changing operation distance is a distance traveled by the vehicle during the lane changing operation, that is, a distance that the vehicle travels forward from the beginning of the lane changing operation to the finish of the lane changing operation.

Exemplarily, the high-precision map data and the standard map data of the road section ahead may be obtained, and the high-precision map data and the standard map data of the road section ahead may be preprocessed and integrated to obtain the map data and the traffic data of the road section ahead.

In this embodiment, the map data and the traffic data of the road section ahead may be input into a lane changing decision model, and by using the lane changing decision model, the lane changing result information corresponding to the vehicle performing the lane changing operation at the current position and at least one position in front is predicted.

Optionally, the lane changing decision model may be a combination model of deep learning, which may predict that the vehicle will start performing the lane changing operation at the current position and the lane changing result information of changing to the target lane based on the map data and the traffic data of the road section ahead; and by means of position point shifting, it may be predicted that the vehicle will start performing the lane changing operation at at least one position in front and the lane changing result information of changing to the target lane.

In practical applications, a weather condition and the vehicle's own ability to change a lane in autonomous driving will affect the vehicle lane changing, when predicting the lane changing result information corresponding to the vehicle performing the lane changing operation at a certain location, a current weather condition and the vehicle's own ability to change a lane in autonomous driving may also be considered.

Exemplarily, the high-precision map data, the standard map data, and other data may be combined to determine various data information of the road section ahead as an input of the lane changing decision model.

For example, the various data information of the road section ahead and a data source corresponding to the data information may be as shown in Table 1:

TABLE 1

| Data source | Obtaining data information |
|---|---|
| High-precision map data | Lane line information, lane information, traffic condition of each lane in the road section ahead |
| Standard map data | Traffic condition on the road section ahead |
| Other data | Information of local weather condition, information of autonomous driving lane changing capability of the vehicle |

This step may be implemented in the following ways:
predicting the lane changing result information corresponding to the vehicle performing the lane changing operation at the current position and at least one position in front, respectively, according to the map data and the traffic data of the road section ahead, current weather condition, and information of autonomous driving lane changing capability of the vehicle. In this way, the lane changing result information corresponding to the vehicle performing the lane changing operation at the current position and at least one position in front may be predicted more accurately, so as may determine whether to start performing the lane changing operation at the current position more accurately.

Optionally, the information on current local weather condition where the vehicle is located may be obtained according to the current position of the vehicle.

Optionally, the information of autonomous driving lane changing capability is a system score on the autonomous driving lane changing capability of the autonomous system based on a lane changing logic and historical data of the autonomous driving system of the vehicle, which may be obtained from an evaluation platform of the autonomous driving system based on identification information such as a version of the autonomous driving system of the vehicle.

Where the evaluation platform of the autonomous driving system is used to evaluate the automatic driving lane changing capability of each version of the automatic driving system according to the lane changing logic and the historical data of each version of the autonomous driving system, and provide an evaluation result.

Step S308, determining whether to perform the lane changing operation at the current position according to the lane changing result information corresponding to the vehicle performing the lane changing operation at the current position and at least one position in front.

In this embodiment, a lane changing decision model may further determine whether to perform the lane changing operation at the current position according to the lane changing result information corresponding to the vehicle performing the lane changing operation at the current position and at least one position in front, and with comprehensive consideration of difficulty, rationality and safety of the vehicle lane changing when the vehicle starts to perform lane changing operations at various positions.

In this step, if a determination result is to execute the lane changing operation at the current position, it means that the current position is the preferred position for the vehicle to start the lane changing operation, starting to perform the lane changing operation at the current position may ensure that the vehicle enters the target lane before driving to the bifurcation and may avoid prematurely changing to the target lane, then step S307 is executed and the lane changing operation execution information is issued.

If the determination result is not to execute the lane changing operation at the current position, it means that the current position is not the preferred position where the vehicle starts to perform the lane changing operation, then proceed to step S304, the map data and the traffic data of the road section ahead is updated based on a up-to-date position of the vehicle, it is determined that whether to start performing the lane changing operation at the position where the vehicle is located, until when the vehicle reaches a suitable position for starting to perform the lane changing operation; and it is determined to start performing the lane changing operation at the suitable position, and the lane changing operation execution information is issued.

Step S309, if it is determined to perform the lane changing operation at the current position, issuing the lane changing operation execution information.

Where the lane changing operation execution information may be a lane changing operation execution instruction issued to the autonomous driving system of the vehicle, or it may be a lane changing operation execution prompt issued by an output apparatus of the vehicle, or it may be other information used to prompt the vehicle to start performing the lane changing operation, which is not specifically limited here.

Optionally, when it is determined to perform the lane changing operation at the current position, the electronic device sends the lane changing operation execution instruction to the autonomous driving system of the vehicle, so that the autonomous driving system may control the vehicle to perform the lane changing operation according to the lane changing operation execution instruction, thereby realizing the lane changing control.

Exemplarily, when the lane changing operation execution instruction is sent to the autonomous driving system of the vehicle, the lane changing operation execution instruction may be integrated into the updated navigation information issued to the vehicle and issued to a vehicle-machine map of the vehicle. The vehicle-machine map obtains the lane changing operation execution instruction by analyzing the navigation information, and transmits the lane changing operation execution instruction to the autonomous driving system of the vehicle. The autonomous driving system of the vehicle controls the vehicle to start performing the lane changing operation.

Exemplarily, the lane changing operation execution instruction may be directly issued to the car-machine map of the vehicle, the car-machine map transmits a received lane changing operation execution instruction to the autonomous driving system of the vehicle, and the autonomous driving system of the vehicle controls the vehicle to start performing the lane changing operation.

After starting performing the lane changing operation, the vehicle enters the status of preparing for lane changing, the next time the autonomous driving status of the vehicle is reported, the autonomous driving status of the vehicle is preparing for lane changing.

Optionally, in practical applications, when a driver is driving the vehicle on the road, the driver's field of view is limited and may not accurately observe the condition of the road section ahead, and there is a situation of changing a lane too early or too late. The method provided in this embodiment may also be applied to ordinary vehicles, and may assist the driver in vehicle lane changing. If it is determined that the lane changing operation is performed at the current position, a lane changing operation execution prompt is issued to remind the driver that the lane changing operation may be started at the current position.

Optionally, the executive entity of this embodiment may be the autonomous driving system of the vehicle, if it is determined that the lane changing operation is performed at the current position, the autonomous driving system controls the vehicle to perform the lane changing operation.

The autonomous driving system controls the vehicle to start performing the lane changing operation, which means to control the vehicle to start preparing for lane changing, and change to the target lane when it is suitable for lane changing based on sensing information of a sensor in the vehicle. The process of controlling the autonomous driving vehicle to start preparing for lane changing and changing a lane is realized by using an existing method, which will not be repeated here.

The present application takes advantages of the high-precision map containing lane-level map information and traffic conditions, as well as the accumulation of historical big data, to systematically evaluate the lane changing strategies of different vehicles in different driving environments, which may help vehicles find the optimal position to start performing the lane changing operation, to ensure that an average driving efficiency of the vehicle is improved when the vehicle successfully changes to the target lane, as well as to avoid the possibility that the vehicle may not successfully change a lane or drive into a slower lane prematurely due to a fixed lane changing distance limit.

Figure 4:
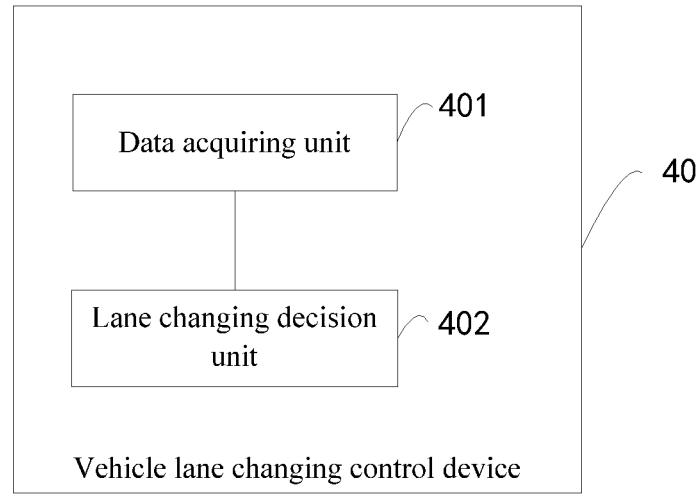
FIG. 4 is a schematic diagram of a device for vehicle lane changing control provided by Embodiment 3 of the present application.

FIG. 4 is a schematic diagram of a device for vehicle lane changing control provided by Embodiment 3 of the present application, where the device for the vehicle lane changing control provided in this embodiment of the present application may execute the process flow provided in the embodiment of the method of the vehicle lane changing control. As shown in FIG. 4, a vehicle lane changing control device 40 includes: a data acquiring unit 401 and a lane changing decision unit 402.

Specifically, the data acquiring unit 401 is configured to acquire map data and traffic data of a road section ahead when a distance between a vehicle and a front bifurcation is less than or equal to a longest lane changing operation distance during a process of vehicle driving, where the road section ahead includes at least a road between a current position of the vehicle and the bifurcation, and the vehicle needs to change from a current lane to a target lane before driving to the bifurcation.

The lane changing decision unit 402 is configured to issue lane changing operation execution information if it is determined to perform the lane changing operation at the current position based on the map data and the traffic data of the road section ahead.

The device provided by this embodiment of the present application may be specifically used to execute the method provided in the above Embodiment 1, and specific functions are not repeated here again.

In this embodiment of the present application, during a process of vehicle driving, when a distance between the vehicle and a front bifurcation is less than or equal to a longest lane changing operation distance, according to map data and traffic data of a road section ahead, it can be determined whether a current position is a preferred position to start performing the lane changing operation, so as to determine whether performing the lane changing operation at the current position; and if it is determined that the current position is the preferred position to start performing the lane changing operation, that is, it is determined to perform the lane changing operation at the current position, lane changing operation execution information is issued to enable the vehicle to start performing the lane changing operation at the current position, being able to select a preferred and more reasonable position to start performing the lane changing operation, improving success rate of the vehicle lane changing, avoiding prematurely changing to a target lane, and improving average driving efficiency of the vehicle.

Figure 5:
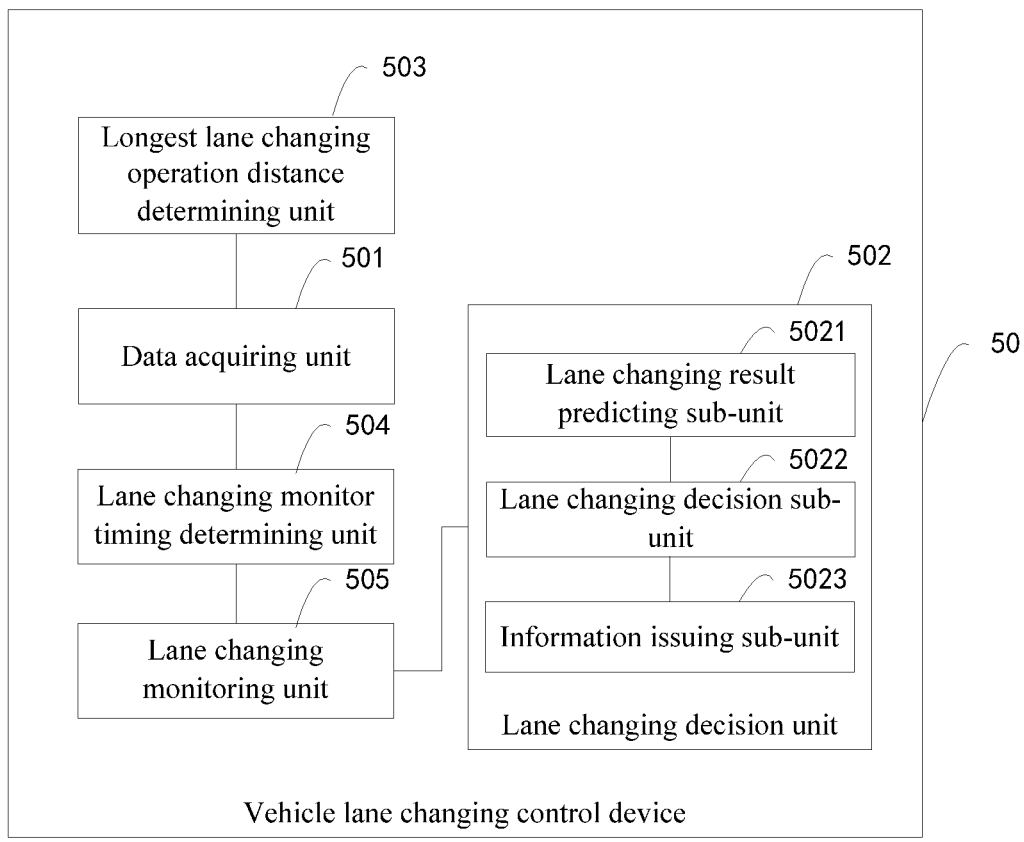
FIG. 5 is a schematic diagram of a device for vehicle lane changing control provided by Embodiment 4 of the present application.

FIG. 5 is a schematic diagram of a device for vehicle lane changing control provided by Embodiment 4 of the present application, where the device for the vehicle lane changing control provided in this embodiment of the present application may execute the process flow provided in the method embodiment of the vehicle lane changing control. As shown in FIG. 5, a vehicle lane changing control device 50 includes: a data acquiring unit 501 and a lane changing decision unit 502.

Specifically, the data acquiring unit 501 is configured to acquire map data and traffic data of a road section ahead when a distance between a vehicle and a front bifurcation is less than or equal to a longest lane changing operation distance during a process of vehicle driving, where the road section ahead includes at least a road between a current position of the vehicle and the bifurcation, and the vehicle needs to change from a current lane to a target lane before driving to the bifurcation.

The Lane changing decision unit 502 is configured to issue lane changing operation execution information if it is determined to perform the lane changing operation at the current position based on the map data and the traffic data of the road section ahead.

Optionally, lane changing decision unit 502 includes:
a lane changing result predicting sub-unit 5021, configured to predict lane changing result information corresponding to the vehicle performing the lane changing operation at the current position and at least one position in front, according to the map data and the traffic data of the road section ahead.
a lane changing decision sub-unit 5022, configured to determine whether to perform the lane changing operation at the current position according to the lane changing result information corresponding to the vehicle performing the lane changing operation at the current position and at least one position in front.

an information issuing sub-unit 5023, configured to issue the lane changing operation execution information if it is determined to perform the lane changing operation at the current position.

Optionally, the lane changing result predicting sub-unit 5021 is further configured to:
predict the lane changing result information corresponding to the vehicle performing the lane changing operation at the current position and at least one position in front, respectively, according to the map data and the traffic data of the road section ahead, current weather condition, and information of autonomous driving lane changing capability of the vehicle.

Where the lane changing result information includes at least one of the following: a duration required for the lane changing, a lane changing operation distance, a distance and a duration of driving in the target lane after the lane changing succeeds and a speed difference of the vehicle before and after the lane changing, and the lane changing operation distance is a distance traveled by the vehicle during the lane changing operation.

Optionally, as shown in FIG. 5, the vehicle lane changing control device 50 further includes:
a longest lane changing operation distance determining unit 503, configured to:
determine an initial lane changing operation distance of the road section ahead according to a road level of the road section ahead; determine a lane changing operation distance adjustment value according to a historical lane changing operation distances of the road section ahead in a current period of time; and determine the longest lane changing operation distance according to the initial lane changing operation distance of the road section ahead and the lane changing operation distance adjustment value.

Optionally, as shown in FIG. 5, the vehicle lane changing control device 50 further includes:
a lane changing monitor timing determining unit 504, configured to:
before acquiring the map data and the traffic data of the road section ahead when the vehicle is traveling and a distance between the vehicle and a front bifurcation is less than or equal to the longest lane changing operation distance, acquire the current position, a driving route and lane-level navigation information of the vehicle; according to the current position and the driving route of the vehicle, determine information of a next maneuvering point of the vehicle; if, according to the information of the next maneuvering point and the lane-level navigation information, it is determined that the vehicle needs to change a lane before driving to the next maneuvering point, determine the target lane that the vehicle needs to change to before driving to the next maneuvering point, where a bifurcation corresponding to the next maneuvering point is the front bifurcation.

Optionally, as shown in FIG. 5, the vehicle lane changing control device 50 further includes:
a lane changing monitoring unit 505, configured to:
if, according to the information of the next maneuvering point, the bifurcation corresponding to the next maneuvering point is determined and it is determined that the vehicle needs to change the lane before driving to the next maneuvering point, after determining the target lane that the vehicle needs to change to before driving to the next maneuvering point, calculate a distance between the current position and the next maneuvering point to obtain the distance between the vehicle and the bifurcation according to the current position of the vehicle; and compare the distance between the vehicle and the bifurcation with the longest lane changing operation distance.

Optionally, the lane changing monitoring sub-unit 505 is further configured to:

before acquiring the map data and the traffic data of the road section ahead when the vehicle is traveling and the distance between the vehicle and the front bifurcation is less than or equal to the longest lane changing operation distance, acquire a current autonomous driving status of the vehicle; and determine that the current autonomous driving status of the vehicle belongs to a status that allows to perform the lane changing operation.

Optionally, the information issuing sub-unit 5023 is further configured to:

if it is determined to perform the lane changing operation at the current position based on the map data and the traffic data of the road section ahead, send a lane changing operation execution instruction to an autonomous driving system of the vehicle to enable the autonomous driving system to control the vehicle to perform the lane changing operation according to the lane changing operation execution instruction.

The device provided by this embodiment of the present application may be specifically used to execute the method embodiment provided in the above Embodiment 2, and specific functions are not repeated here again.

The present application takes advantages of the high-precision map containing lane-level map information and traffic conditions, as well as the accumulation of historical big data, to systematically evaluate the lane changing strategies of different vehicles in different driving environments, which may help vehicles find the optimal position to start performing the lane changing operation, to ensure that an average driving efficiency of the vehicle is improved when the vehicle successfully changes to the target lane, as well as to avoid the possibility that the vehicle may not successfully change a lane or drive into a slower lane prematurely due to a fixed lane changing distance limit.

According to an embodiment of the present application, an electronic device and a readable storage medium are further provided by the present application.

According to an embodiment of the present application, a computer program product is further provided by the present application, the program product includes: a computer program stored in a readable storage medium, and at least one processor of an electronic device is able to read the computer program from the readable storage medium, and the at least one processor executes the computer program to cause the electronic device to execute the solution described in any one of the above embodiments.

Figure 6:
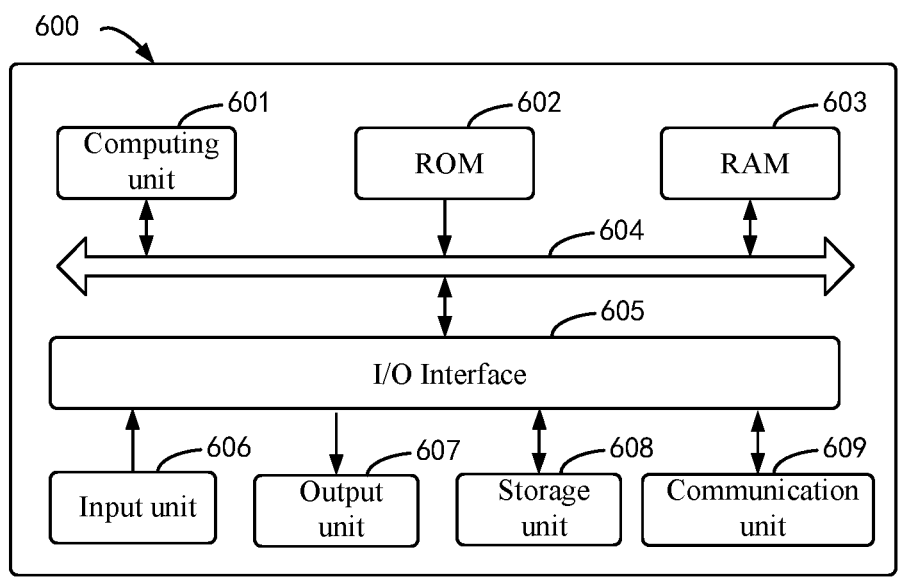
FIG. 6 is a block diagram of an electronic device configured to implement methods of vehicle lane changing control of embodiments of the present application.

FIG. 6 is a schematic block diagram of an example electronic device 600 which can be used to implement the embodiment of the present application. The electronic device is intended to represent various forms of digital computers, such as laptop computers, desktop computers, workstations, personal digital assistants, servers, blade servers, mainframe computers, and other suitable computers. Electronic devices may also represent various forms of mobile apparatuses, such as personal digital assistants, cellular phones, smart phones, wearable devices, and other similar computing apparatuses. The components, their connections and relationships, and their functions shown herein are merely examples, and are not intended to limit the implementation of the present disclosure described and/or required herein.

As shown in FIG. 6, the electronic device 600 includes a computing unit 601, which may execute various appropriate actions and processing according to a computer program stored in a read-only memory (ROM) 602 or a computer program loaded from the storage unit 608 to a random access memory (RAM) 603. In the RAM 603, various programs and data required for the operation of the device 600 may also be stored. The computing unit 601, the ROM 602, and the RAM 603 are connected to each other through a bus 604. An input/output (I/O) interface 605 is also connected to the bus 604.

Multiple components in the device 600 are connected to the I/O interface 605, including: an input unit 606, such as a keyboard, a mouse, etc.; a output unit 607, such as various types of displays, speakers, etc.; a storage unit 608, such as magnetic disks, optical disks, etc.; and a communication unit 609, such as a network card, a modem, a wireless communication transceiver, etc. The communication unit 609 allows the device 600 to exchange information/data with other devices through a computer network such as the Internet and/or various telecommunication networks.

The computing unit 601 may be various general-purpose and/or special-purpose processing components with processing and computing capabilities. Some examples of the computing unit 601 include, but not limited to, a central processing unit (CPU), a graphics processing unit (GPU), various dedicated artificial intelligence (AI) computing chips, various computing units running machine learning model algorithms, a digital signal processor (DSP), and any appropriate processor, controller, micro-controller, etc. The computing unit 601 executes the various methods and processes described above, for example, the method of vehicle lane changing control. For example, in some embodiments, the vehicle lane changing control method may be implemented as a computer software program, which is tangibly contained in a machine-readable medium, such as the storage unit 608. In some embodiments, part or all of the computer programs may be loaded and/or installed on the device 600 via the ROM 602 and/or the communication unit 609. When the computer program is loaded into the RAM 603 and executed by the computing unit 601, one or more steps of the method of vehicle lane changing control described above may be executed. Alternatively, in other embodiments, the computing unit 601 may be configured to perform the method of vehicle lane changing control in any other suitable manner (for example, by means of firmware).

The various embodiments of systems and technologies described herein may be implemented in a digital electronic circuit system, an integrated circuit systems, a field programmable gate array (FPGA), an application-specific integrated circuit (ASIC), an application-specific standard product (ASSP), a system-on-chip (SOC), a Complex Programmable Logic Device (CPLD), computer hardware, firmware, software, and/or their combination. These various implementations may include: being implemented in one or more computer programs, where the one or more computer programs may be executed and/or explained on the programmable system including at least one programmable processor, the programmable processor may be a special-purpose or general-purpose programmable processor, which may receive data and commands from a storage system, at least one input apparatus and at least one output apparatus, and transmit data and commands to the storage system, at least one input apparatus and at least one output apparatus.

Program codes for implementing the method of the present disclosure may be written in any combination of one or more programming languages. These program codes can be provided to a processor or a controller of a general-purpose computer, a special-purpose computer or other programmable data processing apparatuses, so that when executed by the processor or the controller, the program codes enable the functions/operations specified in the flowchart and/or block diagram to be implemented. The program codes can be executed completely on the machine, partially executed on the machine, partially executed on the machine and partially executed on a remote machine or completely executed on the remote machine or the server as a separate software package.

In the context of the present disclosure, a machine-readable medium may be a tangible medium that may contain or store programs for use by or in combination with a command execution system, an apparatus or a device. The machine-readable medium may be a machine-readable signal medium or a machine-readable storage medium. The machine-readable medium may include, but is not limited to, electronic, magnetic, optical, electromagnetic, infrared, or semiconductor systems, apparatuses or devices, or any suitable combination of the above. More specific examples of the machine-readable storage medium will include electrical connections based on one or more lines, a portable computer disk, a hard disk, a random access memory (RAM), a read only memory (ROM), an erasable programmable read only memory (EPROM or flash memory), an optical fiber, a portable compact disk read only memory (CD-ROM), an optical storage devices, a magnetic storage devices or any suitable combination of the above.

In order to provide interaction with users, the systems and techniques described here may be implemented on a computer including a display apparatus for displaying information to the user (such as a CRT (cathode ray tube) or a LCD (liquid crystal display) monitor); and a keyboard and a pointing apparatus (for example, a mouse or a trackball), through which the user can provide input to the computer. Other kinds of apparatuses can also be used to provide interaction with users; for example, the feedback provided to the user may be any form of sensory feedback (for example, visual feedback, auditory feedback, or tactile feedback); and the input from the user can be received in any form (including acoustic input, voice input or tactile input).

The systems and techniques described here may be implemented in a computing system including a background component (such as a data server), or a computing system including a middleware component (such as an application server), or a computing system including a front-end component (such as a user computer having a graphical user interface or a web browser through which a user can interact with the implementations of the systems and technologies described here), or a computing system including any combination of such background component, middleware component, or front-end component. The components of the system can be connected to each other by digital data communication in any form or medium (for example, communication network). Examples of communication networks include a local area network (LAN), a wide area network (WAN), and the Internet.

The computer system may include a client and a server. The client and the server are generally far away from each other and usually interact through a communication network. A relationship between the client and the server is generated by computer programs running on the corresponding computers and having a client-server relationship with each other. The server can be a cloud server, also known as a cloud computing server or a virtual host. It is a host product in the cloud computing service system to solve defects of difficult management and weak business scalability in the traditional physical host and a VPS (Virtual Private Server, or VPS for short). The server can also be a distributed system server or a block-chain server.

It should be understood that the steps can be reordered, added, or deleted using the various forms of processes shown above. For example, the steps recorded in the present application can be performed in parallel, sequentially, or in different orders, as long as the desired results of the technical solution of the present application can be achieved, which is not limited herein.

The above specific implementations do not limit the scope of protection of the present application. Those skilled in the art should understand that various modifications, combinations, sub-combinations and substitutions can be made according to design requirements and other factors. Any modification, equivalent replacement and improvement made within the spirit and the principles of the present application shall be included in the scope of protection of the present application.

What is claimed is:

1. A method for vehicle lane changing control, comprising:
    acquiring map data and traffic data of a road section ahead when a distance between a vehicle and a front bifurcation is less than or equal to a longest lane changing operation distance during a process of vehicle driving, wherein the road section ahead comprises at least a road between a current position of the vehicle and the bifurcation, and the vehicle needs to change from a current lane to a target lane before driving to the bifurcation; and
    if it is determined to perform a lane changing operation at the current position based on the map data and the traffic data of the road section ahead, issuing lane changing operation execution information;
    wherein the method further comprises:
    determining an initial lane changing operation distance of the road section ahead according to a road level of the road section ahead;
    determining a lane changing operation distance adjustment value according to a historical lane changing operation distance of the road section ahead in a current period; and
    determining the longest lane changing operation distance according to the initial lane changing operation distance of the road section ahead and the lane changing operation distance adjustment value.

2. The method according to claim 1, wherein if it is determined to perform the lane changing operation at the current position based on the map data and the traffic data of the road section ahead, issuing the lane changing operation execution information comprises:
    predicting lane changing result information corresponding to the vehicle performing the lane changing operation at the current position and at least one position in front, according to the map data and the traffic data of the road section ahead;
    determining whether to perform the lane changing operation at the current position according to the lane changing result information corresponding to the vehicle performing the lane changing operation at the current position and at least one position in front; and if it is determined to perform the lane changing operation at the current position, issuing the lane changing operation execution information.

3. The method according to claim 2, wherein the predicting the lane changing result information corresponding to the vehicle performing the lane changing operation at the current position and at least one position in front, according to the map data and the traffic data of the road section ahead comprises:
predicting the lane changing result information corresponding to the vehicle performing the lane changing operation at the current position and at least one position in front, respectively, according to the map data and the traffic data of the road section ahead, current weather condition, and information of autonomous driving lane changing capability of the vehicle;
wherein the lane changing result information comprises at least one of the following: a duration required for lane changing, a lane changing operation distance, a distance and a duration of driving in the target lane after the lane changing succeeds and a speed difference of the vehicle before and after the lane changing, and the lane changing operation distance is a distance traveled by the vehicle during a process of performing the lane changing operation.

4. The method according to claim 2, before acquiring the map data and the traffic data of the road section ahead when the vehicle is traveling and the distance between the vehicle and the front bifurcation is less than or equal to the longest lane changing operation distance, further comprising:
acquiring the current position, a driving route and lane-level navigation information of the vehicle;
determining information of a next maneuvering point of the vehicle according to the current position and the driving route of the vehicle; and
if, according to the information of the next maneuvering point and the lane-level navigation information, it is determined that the vehicle needs to change a lane before driving to the next maneuvering point, determining the target lane that the vehicle needs to change to before driving to the next maneuvering point, wherein a bifurcation corresponding to the next maneuvering point is the front bifurcation.

5. The method according to claim 2, wherein if it is determined to perform the lane changing operation at the current position, issuing the lane changing operation execution information comprises:
if it is determined to perform the lane changing operation at the current position based on the map data and the traffic data of the road section ahead, sending a lane changing operation execution instruction to an autonomous driving system of the vehicle to enable the autonomous driving system to control the vehicle to perform the lane changing operation according to the lane changing operation execution instruction.

6. The method according to claim 1, before acquiring the map data and the traffic data of the road section ahead when the vehicle is traveling and the distance between the vehicle and the front bifurcation is less than or equal to the longest lane changing operation distance, further comprising:
acquiring the current position, a driving route and lane-level navigation information of the vehicle;
determining information of a next maneuvering point of the vehicle according to the current position and the driving route of the vehicle; and
if, according to the information of the next maneuvering point and the lane-level navigation information, it is determined that the vehicle needs to change a lane before driving to the next maneuvering point, determining the target lane that the vehicle needs to change to before driving to the next maneuvering point, wherein a bifurcation corresponding to the next maneuvering point is the front bifurcation.

7. The method according to claim 6, if, according to the information of the next maneuvering point, the bifurcation corresponding to the next maneuvering point is determined and it is determined that the vehicle needs to change the lane before driving to the next maneuvering point, after determining the target lane that the vehicle needs to change to before driving to the next maneuver point, further comprising:
calculating a distance between the current position and the next maneuvering point to obtain the distance between the vehicle and the bifurcation according to the current position of the vehicle; and
comparing the distance between the vehicle and the bifurcation with the longest lane changing operation distance.

8. The method according to claim 7, before acquiring the map data and the traffic data of the road section ahead when the vehicle is traveling and the distance between the vehicle and the front bifurcation is less than or equal to the longest lane changing operation distance, further comprising:
acquiring a current autonomous driving status of the vehicle; and
determining that the current autonomous driving status of the vehicle belongs to a status that allows to perform the lane changing operation.

9. A device for vehicle lane changing control, comprising:
at least one processor; and
a memory that is connected in communication with the at least one processor; wherein,
the memory stores instructions executable by the at least one processor, and the instructions are executed by the at least one processor to enable the at least one processor to:
acquire map data and traffic data of a road section ahead when a distance between a vehicle and a front bifurcation is less than or equal to a longest lane changing operation distance during a process of vehicle driving, wherein the road section ahead comprises at least a road between a current position of the vehicle and the bifurcation, and the vehicle needs to change from a current lane to a target lane before driving to the bifurcation; and
issue lane changing operation execution information if it is determined to perform the lane changing operation at the current position based on the map data and the traffic data of the road section ahead; and
wherein the at least one processor is further configured to:
determine an initial lane changing operation distance of the road section ahead according to a road level of the road section ahead;
determine a lane changing operation distance adjustment value according to a historical lane changing operation distance of the road section ahead in a current period; and
determine the longest lane changing operation distance according to the initial lane changing operation distance of the road section ahead and the lane changing operation distance adjustment value.

10. The device according to claim 9, wherein the at least one processor is further configured to:

predict lane changing result information corresponding to the vehicle performing the lane changing operation at the current position and at least one position in front, according to the map data and the traffic data of the road section ahead;

determine whether to perform the lane changing operation at the current position according to the lane changing result information corresponding to the vehicle performing the lane changing operation at the current position and at least one position in front; and issue the lane changing operation execution information if it is determined to perform the lane changing operation at the current position.

11. The device according to claim 10, wherein the at least one processor is further configured to:

predict the lane changing result information corresponding to the vehicle performing the lane changing operation at the current position and at least one position in front, respectively, according to the map data and the traffic data of the road section ahead, current weather condition, and information of autonomous driving lane changing capability of the vehicle;

wherein the lane changing result information comprises at least one of the following: a duration required for lane changing, a lane changing operation distance, a distance and a duration of driving in the target lane after the lane changing succeeds and a speed difference of the vehicle before and after the lane changing, and the lane changing operation distance is a distance traveled by the vehicle during a process of performing the lane changing operation.

12. The device according to claim 10, wherein the at least one processor is further configured to:

if it is determined to perform the lane changing operation at the current position, send a lane changing operation execution instruction to an autonomous driving system of the vehicle to enable the autonomous driving system to control the vehicle to perform the lane changing operation according to the lane changing operation execution instruction.

13. The device according to claim 9, wherein the at least one processor is further configured to:

before acquiring the map data and the traffic data of the road section ahead when the vehicle is traveling and the distance between the vehicle and the front bifurcation is less than or equal to the longest lane changing operation distance, acquire the current position, a driving route and lane-level navigation information of the vehicle;

determine information of a next maneuvering point of the vehicle according to the current position and the driving route of the vehicle; and if, according to the information of the next maneuvering point and the lane-level navigation information, it is determined that the vehicle needs to change a lane before driving to the next maneuvering point, determine the target lane that the vehicle needs to change to before driving to the next maneuvering point, wherein a bifurcation corresponding to the next maneuvering point is the front bifurcation.

14. The device according to claim 13, wherein the at least one processor is further configured to:

if, according to the information of the next maneuvering point, the bifurcation corresponding to the next maneuvering point is determined and it is determined that the vehicle needs to change the lane before driving to the next maneuvering point, after determining the target lane that the vehicle needs to change to before driving to the next maneuvering point, calculate a distance between the current position and the next maneuvering point to obtain the distance between the vehicle and the bifurcation according to the current position of the vehicle; and compare the distance between the vehicle and the bifurcation with the longest lane changing operation distance.

15. The device according to claim 14, wherein the at least one processor is further configured to:

before acquiring the map data and the traffic data of the road section ahead when the vehicle is traveling and the distance between the vehicle and the front bifurcation is less than or equal to the longest lane changing operation distance, acquire a current autonomous driving status of the vehicle; and determine that the current autonomous driving status of the vehicle belongs to a status that allows to perform the lane changing operation.

16. A non-transitory computer-readable storage medium storing computer instructions, wherein the computer instructions are configured to enable a computer to:

acquire map data and traffic data of a road section ahead when a distance between a vehicle and a front bifurcation is less than or equal to a longest lane changing operation distance during a process of vehicle driving, wherein the road section ahead comprises at least a road between a current position of the vehicle and the bifurcation, and the vehicle needs to change from a current lane to a target lane before driving to the bifurcation; and if it is determined to perform a lane changing operation at the current position based on the map data and the traffic data of the road section ahead, issue lane changing operation execution information; and wherein the computer instructions are further configured to enable a computer to:

determine an initial lane changing operation distance of the road section ahead according to a road level of the road section ahead;

determine a lane changing operation distance adjustment value according to a historical lane changing operation distance of the road section ahead in a current period; and determine the longest lane changing operation distance according to the initial lane changing operation distance of the road section ahead and the lane changing operation distance adjustment value.

* * * * *